US010386051B2

(12) United States Patent
Chen et al.

(10) Patent No.: US 10,386,051 B2
(45) Date of Patent: Aug. 20, 2019

(54) OPTICAL STRUCTURE, LIGHTING UNIT AND A METHOD OF MANUFACTURE

(71) Applicant: SIGNIFY HOLDING B.V., Eindhoven (NL)

(72) Inventors: Min Chen, Shanghai (CN); Lihua Lin, Shanghai (CN); Xiao Sun, Shanghai (CN); Kai Qi Tian, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 14/908,216

(22) PCT Filed: Mar. 11, 2015

(86) PCT No.: PCT/EP2015/055025

§ 371 (c)(1),
(2) Date: Jan. 28, 2016

(87) PCT Pub. No.: WO2015/140017

PCT Pub. Date: Sep. 24, 2015

(65) Prior Publication Data

US 2016/0377272 A1 Dec. 29, 2016

(30) Foreign Application Priority Data

Mar. 21, 2014 (WO) ................ PCT/CN2014/000311
Jun. 10, 2014 (EP) .................................... 14171704

(51) Int. Cl.
*F21V 23/00* (2015.01)
*F21V 23/04* (2006.01)
(Continued)

(52) U.S. Cl.
CPC ............ *F21V 23/005* (2013.01); *B29C 64/00* (2017.08); *F21K 9/60* (2016.08); *F21K 9/68* (2016.08); *F21K 9/90* (2013.01); *F21V 5/04* (2013.01); *F21V 5/045* (2013.01); *F21V 7/0091* (2013.01); *F21V 23/045* (2013.01); *F21V 23/0457* (2013.01); *F21Y 2115/10* (2016.08); *H05B 37/0272* (2013.01)

(58) Field of Classification Search
CPC .......... F21V 23/005; F21V 5/04; F21V 5/045; F21V 7/0091; F21V 23/045; F21V 23/0457; F21K 9/60; F21K 9/90; F21K 9/68; F21Y 2115/10; B29C 64/00; H05B 37/0272
USPC .......................................................... 362/235
See application file for complete search history.

(56) References Cited

U.S. PATENT DOCUMENTS 8,136,967 B2 3/2012 Weaver et al.
8,310,404 B2 11/2012 Kishimoto et al.
(Continued)

FOREIGN PATENT DOCUMENTS

CN 202075798 U 12/2011
CN 102369537 A 3/2012
(Continued)

*Primary Examiner* — Anh T Mai
*Assistant Examiner* — Jessica M Apenteng
(74) *Attorney, Agent, or Firm* — Akarsh P. Belagodu

(57) ABSTRACT

An optical structure for processing the light output by a lighting unit, in which an antenna (36) is formed within or over an region (34) of the optical layer (23) of the structure, wherein the region (34) is away from the optical beam processing parts (21) a of the optical layer (23).

19 Claims, 4 Drawing Sheets

(51) Int. Cl.

| | |
|---|---|
| ***F21K 9/60*** | (2016.01) |
| ***F21K 9/90*** | (2016.01) |
| ***F21V 5/04*** | (2006.01) |
| ***F21V 7/00*** | (2006.01) |
| ***F21K 9/68*** | (2016.01) |
| ***B29C 64/00*** | (2017.01) |
| *F21Y 115/10* | (2016.01) |
| *H05B 37/02* | (2006.01) |

(56) References Cited

U.S. PATENT DOCUMENTS

| | | | | |
|---|---|---|---|---|
| 9,435,521 | B2 * | 9/2016 | Chen | F21K 9/23 |
| 2001/0050647 | A1 * | 12/2001 | Kanayama | H01Q 1/243<br>343/702 |
| 2007/0138978 | A1 | 6/2007 | Rains et al. | |
| 2009/0219716 | A1 * | 9/2009 | Weaver | F21V 3/04<br>362/235 |
| 2011/0298355 | A1 | 12/2011 | Van De Ven | |
| 2012/0026726 | A1 | 2/2012 | Recker et al. | |
| 2012/0274208 | A1 | 11/2012 | Chen et al. | |
| 2013/0063317 | A1 * | 3/2013 | Jonsson | H01Q 1/44<br>343/721 |
| 2013/0136454 | A1 * | 5/2013 | Yu | H05B 33/0803<br>398/106 |
| 2013/0155664 | A1 * | 6/2013 | Kim | F21L 4/02<br>362/184 |

FOREIGN PATENT DOCUMENTS

| | | | |
|---|---|---|---|
| EP | 1459600 | A2 | 9/2004 |
| GB | 2484713 | A | 4/2012 |
| JP | 2006080007 | A | 3/2006 |
| JP | 2008052921 | A | 3/2008 |
| JP | 2012084343 | A | 4/2012 |
| JP | 2012227021 | A | 11/2012 |
| JP | 2013528315 | A | 7/2013 |
| JP | 2013255094 | A | 12/2013 |
| RU | 105527 | U1 | 6/2011 |
| WO | 2003055273 | A2 | 7/2003 |
| WO | 2013042009 | A1 | 3/2013 |
| WO | 2013066920 | A2 | 5/2013 |
| WO | 2013103698 | A1 | 7/2013 |

* cited by examiner

OPTICAL STRUCTURE, LIGHTING UNIT AND A METHOD OF MANUFACTURE

CROSS REFERENCE TO RELATED APPLICATIONS

This application is the U.S. National Phase application under 35 U.S.C. § 371 of International Application No. PCT/EP2015/055025, filed Mar. 11, 2015, published as WO 2015/140017 on Sep. 24, 2015, which claims the benefit of Chinese Application Number PCT/CN2014/000311 filed Mar. 21, 2014 and European Patent Application Number 14171704.1 filed Jun. 10, 2014. These applications are hereby incorporated by reference herein.

FIELD OF THE INVENTION

The present invention relates to a lighting unit, an optical structure for use in a lighting unit and a manufacturing method.

BACKGROUND OF THE INVENTION

Lighting units which are controllable by wireless remote controls are known. Indeed, there is now an increasing demand for wirelessly controllable lighting products. The remote control system can for example be based on RF circuitry, requiring at least a receive antenna and RF receiver circuitry to be built into the lighting unit.

RF wireless transmission circuitry is of course widely used in many different wireless applications such as mobile phones, to send and receive wireless signals. However, there are challenges integrating such circuitry into lighting products.

There are many ways to realize the wireless function, giving different options. The option chosen will depend on the desired design flexibility, performance and cost. For example, an antenna can be wire-based or it can instead be printed on a PCB together with RF and control circuitry.

The performance of the antenna is very important to the overall performance of a wireless controllable lighting product.

A typical LED lighting unit can be separated into different building blocks as schematically shown in FIG. 1. The basic elements include a housing 1, an LED driver circuit board 2, an LED package 4 which may include a circuit board on which the LED die is mounted, and an optical beam shaping component 6. The housing 1 can provide a heat sink function to help dissipate heat out of the lamp. The lighting unit has an electrical connector 7 for connection to an electrical socket.

The beam shaping component optically processes the light output from one or more LEDs. Each LED has typically a 3 $mm^2$ size and is mounted on a ceramic support substrate. The beam shaping component is used to provide a desired output beam shape and also to disguise the point source appearance of the LED. The beam shaping component can be a refracting component (such as a lens) or a reflecting component, such as a reflecting collimator.

The antenna is usually integrated onto the LED driver PCB 2 or the LED board inside the lamp. As a result, the wireless signal is shielded by components of the lamp including the heat sink or housing, which is made from a thermally conductive material, typically a metal such as an aluminium alloy. The exit/receive window for wireless signals is also limited by the PCB dimensions, which are made as small as possible within the lamp. US2002/274208A1 discloses a lamp with a front cover, and the antenna is above its heat sink and is placed on a PCB. US2007/138978A1 discloses a solid state light fixture with an optical processing element for converting solid state source output to virtual source. And US20120026726A1 discloses a lamp with optical element and a wireless control module 2620 above its heat sink.

US 2013/0063317 discloses a method of integrating an antenna, in which the antenna is provided on the surface of a lens.

SUMMARY OF THE INVENTION

In US 2013/0063317, the integration of the antenna is difficult to implement with a non-flat lens surface, and it also has an influence on the optical performance of the system since the size of the antenna may need to be large to achieve the desired radiation performance. It therefore may block the light or become visible.

If there is not enough area for antenna printing or it is desired not to impact the optical performance, these methods cannot be easily adopted.

To better address these concerns, it is advantageous to have an optical structure which may enables a large sized antenna to be carried without influencing the optical performance.

According to the invention, there is provided an optical structure, lighting unit and a method of manufacture as claimed in the independent claims.

In one aspect, the invention provides an optical structure for processing the light output by a lighting unit, comprising:

an optical layer which is shaped to define a first beam processing structure for optically processing a light output, and said optical layer being with at least one region offset from the first beam processing structure; and an antenna formed over or within the at least one region.

This structure integrates an antenna with the optical beam shaping component of a lighting unit. By providing the antenna in or over a dedicated region of the optical layer which region is away from the beam processing optics, the size and shape of the antenna can be freely selected, and without significantly influencing the optical output.

The first beam processing structure may comprise a lens. This lens can for example be used for collimating the light output, or for other beam shaping functions. The first beam processing structure can comprise an array of lenses, and the at least one region can then comprise the spaces between those lenses.

The first beam processing structure can instead comprise a reflector or diffuser.

The antenna can thus be integrated into any optical component which is already required by the optical design of the lighting unit.

The optical layer can be formed of a plastics material, such as polycarbonate or PMMA. This provides a low cost support for the antenna. The antenna may be printed on the least one region of the optical layer, for example by 3D surface printing.

The at least one region can be flat, and this makes the application of the antenna more straightforward, for example by printing. However, the at least one region can instead be curved.

The at least one region can comprise a projection over an underlying base, the projection. The projection can base may be formed from a single shaped optical layer. This enables the antenna area to be larger than the lateral space available between the beam shaping elements of the first beam processing structure.

The invention also provides a lighting unit, comprising:

a printed circuit board which carries circuit components;

a lighting arrangement comprising at least one lighting unit on the printed circuit board; and an optical structure of the invention provided over the lighting arrangement, wherein an electrical connection is provided between the antenna of the optical structure and the circuit components on the PCB.

This lighting unit provides an antenna over the PCB which carries the components which connect to the antenna. The antenna can be positioned in such a way that shielding is avoided as it is at a higher level than the PCB.

At least one soldered spring contact on the PCB can be provided with which the antenna makes contact.

In preferred examples, the lighting unit comprises an LED unit.

The circuit components on the PCB can comprise wireless receiver and/or transmitter circuitry, coupled with the antenna, for receiving and/or transmitting wireless lighting control signals.

Instead, the optical structure can further comprise wireless receiver and/or transmitter circuitry formed over or within the at least one region, for receiving and/or transmitting wireless lighting control signals. Thus, the circuitry associated with the antenna can be on a PCB or it can also be provided on (or in) the optical structure.

The invention also provides a method of manufacturing an optical structure for processing the light output by a lighting unit, comprising:

shaping an optical layer to define a first beam processing structure for optically processing a light output from a respective lighting unit, and shaping the optical layer (23) to define at least one region offset from the first beam processing structure; and forming an antenna over or within the at least one region.

The shaping step can comprise providing the optical layer as a plastics material and shaping the at least one region as a projecting part offset from the first beam processing structure; and said forming step can comprise printing the antenna on the surface of the projecting part.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an optical structure for processing the light output by a lighting unit, in which an antenna is formed within or over a region of optical layer of the structure, wherein the region is away/offset from the optical beam processing parts of that layer.

The antenna can be a flat structure or a 3D structure, and the beam shaping function of the optical layer can be a lens function, diffuser function or reflector function. A compact design is enabled, which minimizes the impact to the optical performance. Shielding of the signals to be processed by the antenna is reduced, and the exit window for wireless signals can be maximized.

Figure 1:
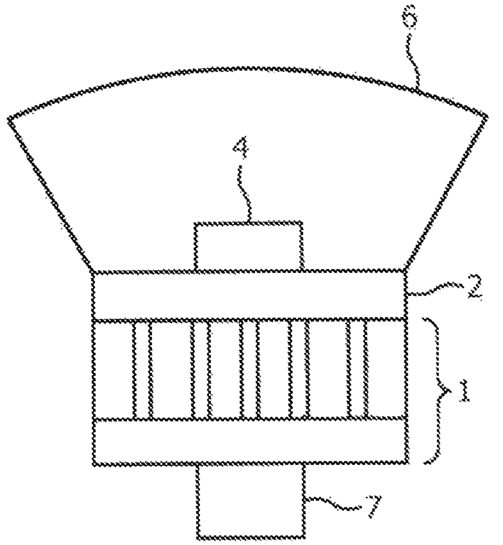
FIG. 1 shows a known structure of an LED lighting unit.

With reference to FIG. 1 which shows the general structure of a lighting unit, the invention provides various designs in which an antenna for wireless communication is integrated into the optical component 6.

Figure 2:
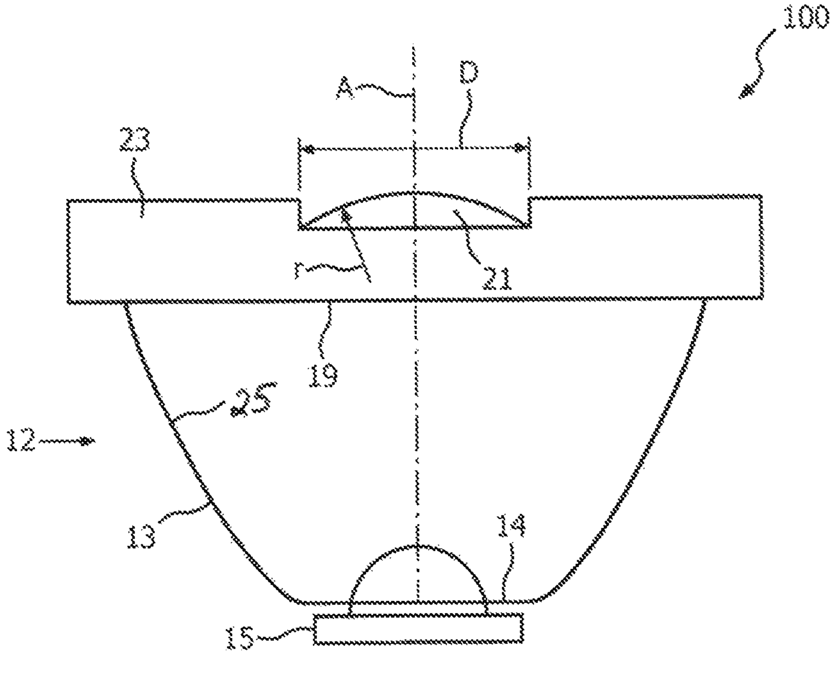
FIG. 2 shows one example of an optical structure which can be used within a lighting unit according to example embodiments.

FIG. 2 shows in more detail one possible implementation of a LED based luminaire 100 comprising collimating optics 12 and a LED light 15. The collimating optics 12 comprises a reflection collimator 13 such as a total internal reflection collimator. The reflection collimator 13 has a first aperture for receiving the LED light. Further, the reflection collimator 13 has a second aperture, or opening 19 for allowing outgoing light to exit the reflection collimator 13. The second aperture 19 is typically of larger size (diameter) than the first aperture. The reflection collimator 13 has an outer wall 25 extending from the first aperture to the second aperture 19. The inner surface of the outer wall 25 is reflective so as to guide the incoming light from the first aperture towards the second aperture 19, thus forming a total internal reflection collimator.

The reflection collimator 13 may be rotation-symmetric about an optical axis A of the reflection collimator 13 extending in a direction from a center of the first aperture towards a center of the second aperture 19. The reflection collimator 13 has a general cup-shaped form with the first aperture being located at the center of the bottom of the cup and the second aperture 19 corresponding to the top opening of the cup.

A convex lens 21 having a diameter D is arranged at the second aperture 19 and covers at least parts of the second aperture 19. The convex lens 21 has a radius of curvature r. The illustrated convex lens 21 is a plano-convex lens. The planar surface of the plano-convex lens faces the second aperture 19. In some cases, the convex lens 21 may be a conic convex lens. Further, other aspheric lens structures may be used to replace the spherical surface of the convex lens 21.

Preferably, the optical axis of the convex lens 21 corresponds to the optical axis A of the reflection collimator 13.

The collimating optics 12 comprises a surface plate 23 which either defines the lens shape or provides a support for mounting of the lens. In either case, the plate 23 and the lens together define an optical layer. Within the second aperture 19 the optical layer performs a first beam processing function for optically processing the LED light output.

The surface plate 23 covers the second aperture 19. The surface plate 23 is made of a translucent material.

Figure 3:
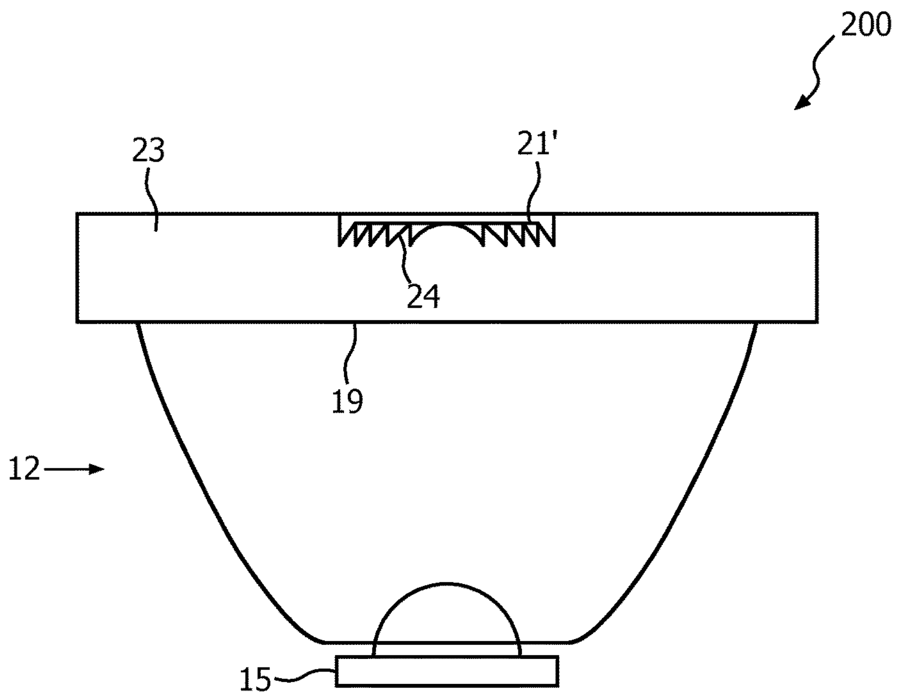
FIG. 3 shows another example of an optical structure which can be used within a lighting unit according to example embodiments.

FIG. 3 shows an alternative luminaire 200 again comprising a collimating optics 12 and a LED light 15. The collimating optics 12 of the luminaire 200 differs from the collimating optics 12 of the luminaire 100 in that the convex lenses is a Fresnel lens 21'.

The Fresnel lens comprises a plurality of facets 24 also known as Fresnel zones. The facets 24 are concentric annular sections of the lens.

The Fresnel lens 21' is shown as formed integrally with the surface plate 23. Indeed, the whole collimating optics 12 may be formed in one piece comprising only one kind of material such as plastics.

This invention relates to a lighting unit and optical layer in which the optical layer extends beyond the region of light output, namely beyond the second exit window 19. Thus, the optical layer has regions with the purpose of optical beam shaping, through which output from the light source is intended to be provided, and additional regions which are not intended to provide a light output. There will of course be some light leakage giving rise to light passing through these additional regions, but they are not intended or designed to perform a beam processing function.

Figure 4:
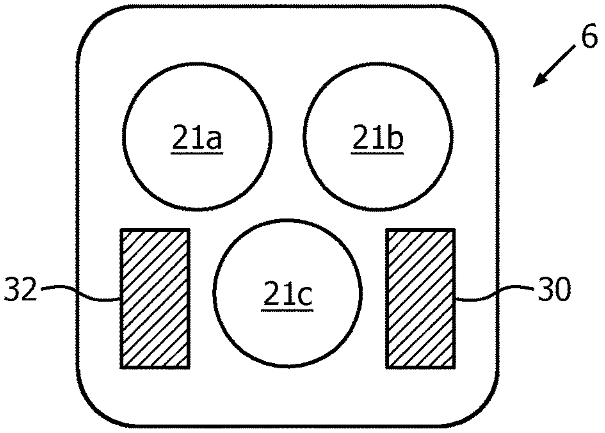
FIG. 4 shows an example of optical structure in schematic form.

FIG. 4 shows an example of the optical component 6. This example is for providing beam shaping for a set of three light sources. The light sources are typically LEDs as in the examples of FIGS. 2 and 3, although the invention is not limited to LED lighting, and the light sources can be other types of lamp. The component has three separate beam shaping components 21*a*, 21*b*, 21*c*.

These beam shaping components are shown schematically in FIG. 4. They can each comprise a lens (either a refractive lens or a Fresnel lens), a collimator, a diffuser or a reflector for example, or indeed combinations of these. The examples of FIGS. 2 and 3 show combinations of lenses and reflecting collimators, but these are purely by way of example. Furthermore, FIGS. 2 and 3 only show the optical components. The lamp will also include the driver/control board for controlling the light source as well as heat dissipation components.

The optical component 6 is positioned at the outward (front side) of the lamp, in particular forming the surface plate 23.

The antenna 30 is provided on or integrated within the optical component 6 but offset from the beam shaping components 21*a*, 21*b*, 21*c*. By this is meant that they are away from the light path through the beam shaping components. An electrical connection is provided to connect the antenna to the RF circuitry and control circuit. In one example, part of all of the RF circuitry is also provided on or within the optical component 6, as represented by the unit 32 in FIG. 4.

The optical component can be formed from polycarbonate (PC) or poly(methyl methacrylate) (PMMA) by way of non limiting examples. Other plastics can be used such as PET (polyethylene terephthalate), PE (polyethylene), PCT (polychlohexylenedimethylene Terephthalate), or it can optionally be made of glass. For plastics materials, the plate can be injection molded, insert molded, extruded or 3D printed for example.

Figure 5:
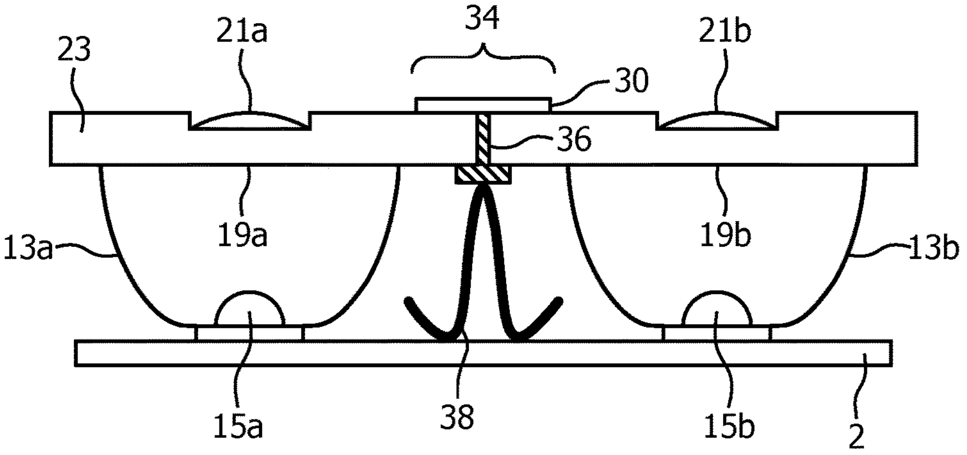
FIG. 5 shows a first example of lighting unit in more detail.

FIG. 5 shows a first example of lighting unit comprising a set of LEDs and associated collimating optics, each in the form as shown in FIG. 2. Two LED arrangements are shown, as 13*a*,15*a*,19*a*,21*a* and 13*b*,15*b*,19*b*,21*b*. The antenna 30 is provided on the outer surface of the optical sheet 23 in a region 34 offset from the beam shaping parts of the optical sheet 23.

To make electrical connection between the antenna 30 and the main driver PCB, a contact via 36 extends through the sheet 23, and a spring contact 38 connects between the lower surface of the sheet 23 and the PCB 2. The driver circuitry components as well as the RF receiver circuitry are provided on the PCB 2 but are not shown to avoid cluttering the figure.

In an alternative arrangement, the antenna is provided on the inner surface of the optical sheet 23 in the region 34 offset from the beam shaping parts of the optical sheet. This avoids the need for contact to be made through the sheet.

Figure 6:
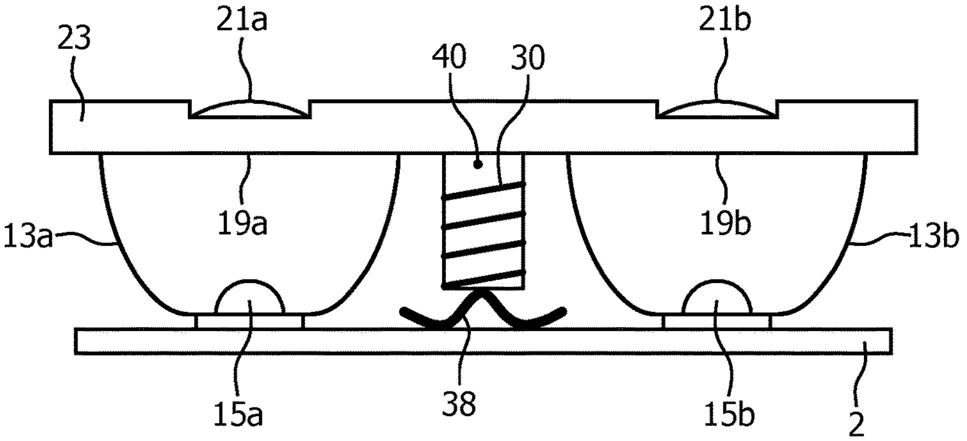
FIG. 6 shows a second example of lighting unit in more detail.

FIG. 6 shows a first alternative design in which the antenna 30 is not provided on a flat part of the sheet, but is provided on a raised projection 40. This can be a molded or extruded part of the optical sheet 23 or else a separately formed component which is attached to the optical sheet.

The antenna 30 can be provided on the 3D surface of the projection 40 to save space and minimize the impact to the whole product design. In this example, the projection is between the collimators. Since most of the light will go through the collimator, the impact to optical performance is greatly reduced.

Figure 7:
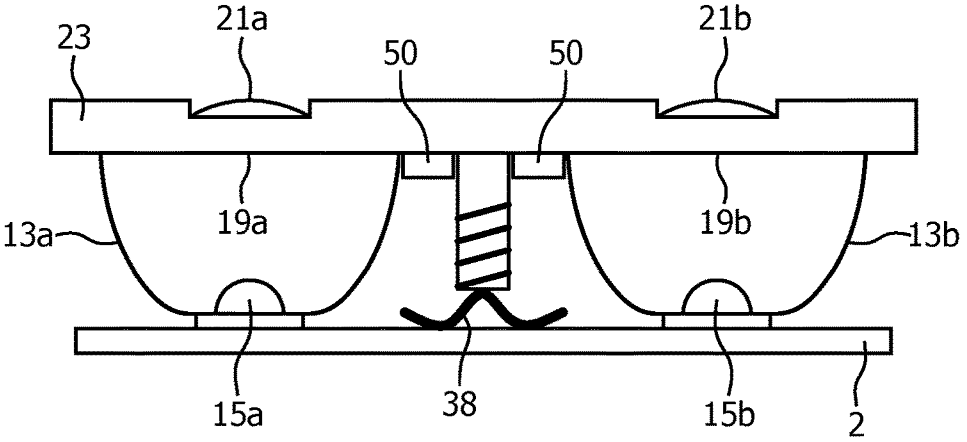
FIG. 7 shows a third example of lighting unit in more detail.

FIG. 7 shows a second alternative design in which other circuitry components or IC chips 50 are provided on or in the optical sheet 23. These can be some or all of the RF receiver circuitry. For example, an RF chip may occupy an area of around 0.5 $mm^2$.

The connection from the antenna to the circuit board is shown as using a spring contact 38 in each of FIGS. 5 to 7. However, other electro-mechanical connections can be used such as pin contacts, soldered wires, or by using conductive adhesive, for example. Low temperature soldering can be used between the antenna and a connection wire, and between the connection wire and the printed circuit board.

The antenna can be formed by surface printing, either onto a flat surface of the optical sheet 23 or onto the projection. 3D surface printing can be implemented using laser restructuring printing (LRP), 3D pattern printing or 3D aerosol printing. LRP uses 3D screen printing with silver paste to build up a conductive track which can then form the antenna. A laser is used to refine the track shapes. The minimum line thickness and track spacing can be around 0.15 mm. This method also has the capability of forming connected through holes.

Aerosol Jet printing uses nano-materials to produce fine feature circuitry and embedded components without using masks or patterns. The resulting functional electronics can have line widths and pattern features ranging from tens of microns to centimeters.

Alternatively, the antenna can be provided on a flexible printed circuit board, which can then be wrapped around the projection 40.

The wireless performance of such a 3D antenna is better than a PCB antenna or ceramic antenna built on the ceramic LED board because of the reduced shielding from the housing or heat sink.

A test of a flat LRP antenna on a lens layer as shown in FIG. 4 for an MR16 luminaire has shown a good ZigBee wireless control distance of 15 m, which is better than obtained with previous PCB antennas. By providing a projection and a 3D antenna, there is increased design flexibility on size and direction, so that better wireless performance can be obtained compared to a flat antenna. This addresses the challenge of providing a high performance antenna within a small sized lamp such as a spot light lamp.

For example, for a $\lambda/4$ monopole antenna at the 2.4 GHz band for ZigBee communication, the standard size of antenna is about 3.1 cm long. For a $\lambda/2$ dipole antenna at 900 MHz band for RFID communication, the standard size is about 16.7 cm long, which is too long in most cases.

For this reason, a meandering antenna shape is needed with a total length generally in the range 3 cm to 10 cm, which is extremely difficult to implement in a compact lamp such as spot light if a flat antenna is to be used. By providing the antenna on a curved projection, the space limitation is relaxed.

The design can be manufactured using mass production techniques, and more simply than using a wire antenna. The shape and size of the antenna can be precisely controlled by the printing process. The manufacturing method can be made flexible with different antenna designs for different applications, as the design can be changed by printer control software.

The antenna direction can be also optimized for best signal transmission and reception by avoiding shielding and pointing to the anticipated signal source. The size of the projection is dependent on the needs of the antenna size and may be limited by the manufacturing process.

Some different possible manufacturing methods for the sheet 23 are described above. The reflector part of the collimator can be formed integrally with the sheet 23 and thus formed by the same process. It may instead be formed as a separate component, for example made by injection molding, stamping or other forming process with a reflective material. Alternatively, there may be a step of reflective painting on the inside surface of the reflector.

Figure 8:
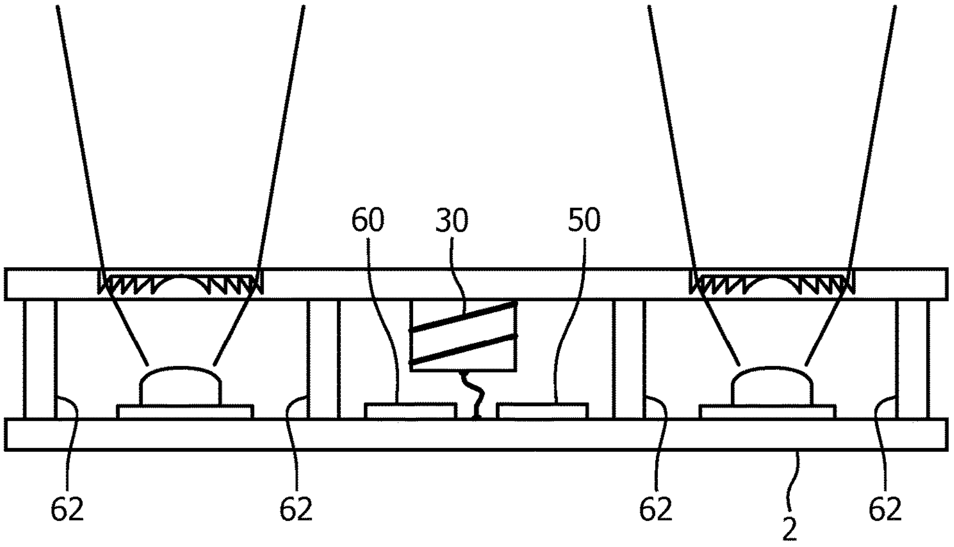
FIG. 8 shows a fourth example of lighting unit in more detail.

The examples above all show reflective collimators. FIG. 8 shows an example which only uses Fresnel lenses as the beam shaping optics. FIG. 8 also shows the RF circuitry 50 as well as the LED driver circuitry 60 on the main PCB 2. Spacers 62 are provided around the LEDs, and these can be reflective. FIG. 8 again shows the antenna formed on a projection, and shows a soldered wire connection to the PCB.

There are thus a number of different alternatives for the antenna design, the antenna positioning, the type of beam shaping optics and the type of light source. These options can be selected independently.

The invention can be applied to a single light source, in which case the optical sheet 23 has a region extending beyond the single beam shaping optical element for the purposes of mounting the antenna. It can instead be applied to an array of light sources, such as three as shown in the example above. These may be of different colours, and the optics can further provide light mixing. However, even for identical colour light sources there can be an array, such as an array of LEDs. The array may typically comprise up to tens of individual LEDs.

The examples above all show surface mounted antenna designs. However, the optical sheet can be molded around an antenna so that the antenna is embedded with the optical sheet. This can be achieved by insert molding of an antenna formed as a metal layer into a plastic lens.

Figure 9:
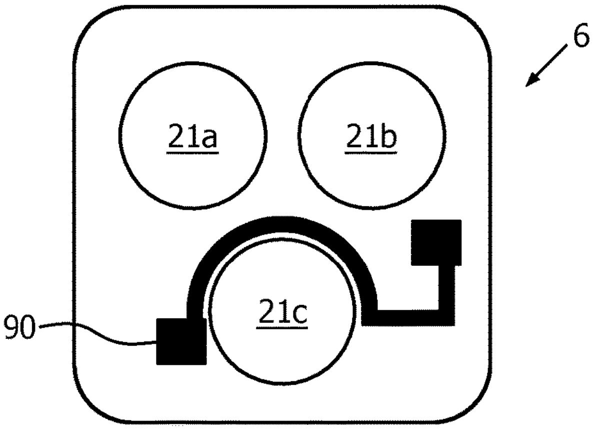
FIG. 9 shows one example of antenna layout.

The antenna can follow any desired shape to achieve the desired length and width. By way of example, FIG. 9 shows an antenna pattern 90, which may have a width of around 2 mm and a length of 30 mm to 40 mm.

The optical sheet and the collimating reflectors can be molded as a single component. The light output from the LED can be reflected at the inner surface of the collimating reflectors by total internal reflection so that the complete structure can be formed from a transparent material to provide both the lensing function and reflection function.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An optical structure for processing the light output by a lighting unit, comprising:

an optical layer including:

a translucent plate having an inner surface and an outer surface; and a first beam processing structure for optically processing a light output, the first beam processing structure including at least one collimator or reflector arranged at the inner surface of the translucent plate to direct the light output through the optical layer;

said translucent plate comprising at least one region, wherein the entirety of the at least one region is laterally offset from the first beam processing structure in a first direction; and circuitry or a chip connected to the inner or outer surface of the translucent plate and arranged entirely within the at least one region; or, the circuitry or the chip integrated and arranged entirely within the translucent plate in the at least one region.

2. An optical structure as claimed in claim 1, wherein the first beam processing structure comprises a lens and the processed light output is collimated light.

3. An optical structure as claimed in claim 1, wherein the first beam processing structure comprises a reflector or diffuser.

4. An optical structure as claimed in claim 1, wherein the optical layer is formed of a plastics material.

5. An optical structure as claimed in claim 4, wherein the optical layer is formed of polycarbonate or PMMA.

6. An optical structure as claimed in claim 1, wherein the optical layer further comprises an antenna printed on the at least one region.

7. An optical structure as claimed in claim 6, wherein the antenna is formed by 3D surface printing.

8. An optical structure as claimed in claim 1, wherein the at least one region is flat or curved.

9. An optical structure as claimed in claim 1, wherein the at least one region comprises a projection over an underlying base, wherein the projection and base are formed from a single shaped optical layer.

10. A lighting unit, comprising:

a printed circuit board which carries circuit components;

a lighting arrangement comprising at least one lighting unit on the printed circuit board; and an optical structure as claimed in claim 1 provided over the lighting arrangement, wherein an electrical connection is provided between the circuitry or the chip of the optical structure and the circuit components on the PCB.

11. A lighting unit as claimed in claim 10, comprising at least one soldered spring contact on the PCB with which the circuitry or the chip makes contact, wherein the lighting unit comprises an LED unit.

12. A lighting unit as claimed in claim 10, wherein the circuit components on the PCB comprise wireless receiver and/or transmitter circuitry coupled with the antenna, for receiving and/or transmitting wireless lighting control signals.

13. A lighting unit as claimed in claim 10, wherein the optical structure further comprises wireless receiver and/or transmitter circuitry formed over or within the at least one region, for receiving and/or transmitting wireless lighting control signals.

14. An optical structure as claimed in claim 1, wherein the at least one region comprises a projection over an underlying base, wherein the projection is a separately formed component that is attached to the base.

15. An optical structure as claimed in claim 1, wherein the circuitry comprises wireless receiver and/or transmitter circuitry.

16. An optical structure as claimed in claim 1, wherein the circuitry comprises at least part of an RF circuitry or an RF chip.

17. An optical structure as claimed in claim 1, wherein the optical structure further comprises an antenna on or within the at least one region.

18. A method of manufacturing an optical structure for processing the light output by a lighting unit, comprising:

shaping a translucent optical layer with a translucent plate and a first beam processing structure for optically processing a light output from a respective lighting unit, positioning a collimator or reflector of the first beam processing structure at an inner surface of the translucent plate to direct the light output through the optical layer, wherein at least one region of the translucent plate is laterally offset from the first beam processing structure, wherein the entirety of the at least one region is laterally offset from the first beam processing structure in a first direct; and forming circuitry or a chip connected to the inner surface or an outer surface of the translucent plate and entirely within the at least one region; or forming the circuitry or the chip such that the circuitry or the chip is integrated within translucent plate and entirely within the at least one region.

19. A method as claimed in claim 18, wherein:

said shaping step comprises providing the optical layer as a plastics material and shaping the at least one region as a projecting part offset from the first beam processing structure.

* * * * *